United States Patent [19]

Takahashi

[11] Patent Number: 5,309,550
[45] Date of Patent: May 3, 1994

[54] METHOD AND APPARATUS FOR THREE DIMENSIONAL DISPLAY WITH CROSS SECTION

[75] Inventor: Kazushige Takahashi, Yokohama, Japan

[73] Assignee: Kabushiki Kaisha Toshiba, Kawasaki, Japan

[21] Appl. No.: 996,493

[22] Filed: Dec. 30, 1992

Related U.S. Application Data

[63] Continuation of Ser. No. 453,507, Dec. 20, 1989, abandoned.

[30] Foreign Application Priority Data

Dec. 27, 1988 [JP] Japan .................................. 63-327903

[51] Int. Cl.$^5$ ...................... G06F 15/62; G06F 15/72; G06F 15/16
[52] U.S. Cl. .................................. 395/121; 395/135; 395/163; 395/122
[58] Field of Search ................ 395/121, 122, 124, 127, 395/135, 134, 129, 163; 340/729, 744

[56] References Cited

U.S. PATENT DOCUMENTS

| | | | |
|---|---|---|---|
| 4,737,921 | 4/1988 | Goldwasser et al. | 395/121 |
| 4,879,668 | 11/1989 | Cline et al. | 395/124 |
| 4,882,679 | 11/1989 | Tuy et al. | 340/729 X |
| 4,907,174 | 3/1990 | Priem | 395/122 |
| 4,984,157 | 1/1991 | Cline et al. | 395/124 X |

FOREIGN PATENT DOCUMENTS 0216156 4/1987 European Pat. Off. .

OTHER PUBLICATIONS

Foley et al., *Fundamentals of Interactive Computer Graphics*, Addison-Wesley, 1982, pp. 560-565.

Kitney et al, "Ultrasonic Imaging of Arterial Structures Using 3D Solid Modeling", IEEE Computer Society Press, Sep. 25, 1988, pp. 3-6.

Foley et al., "Fundamentals of Interactive Computer Graphics," Addison-Wesley Publishing Company, Inc., 1982, pp. 572-573 (Japanese Edition).

*Primary Examiner*—Raymond J. Bayerl
*Attorney, Agent, or Firm*—Foley & Lardner

[57] ABSTRACT

A method and an apparatus for three dimensional display with cross section capable of displaying three dimensionally in real time, according to which a surface image in which the object is cut at the cutting plane and the cross section is left open is generated from the surface data and the cutting plane data, while at the same time a cross sectional image in which an interior region of the cross section is painted out in a prescribed color is generated from the surface data and the cutting plane data, and the surface image and the cross sectional image are displayed with the cross sectional image superposed on the surface image.

8 Claims, 9 Drawing Sheets

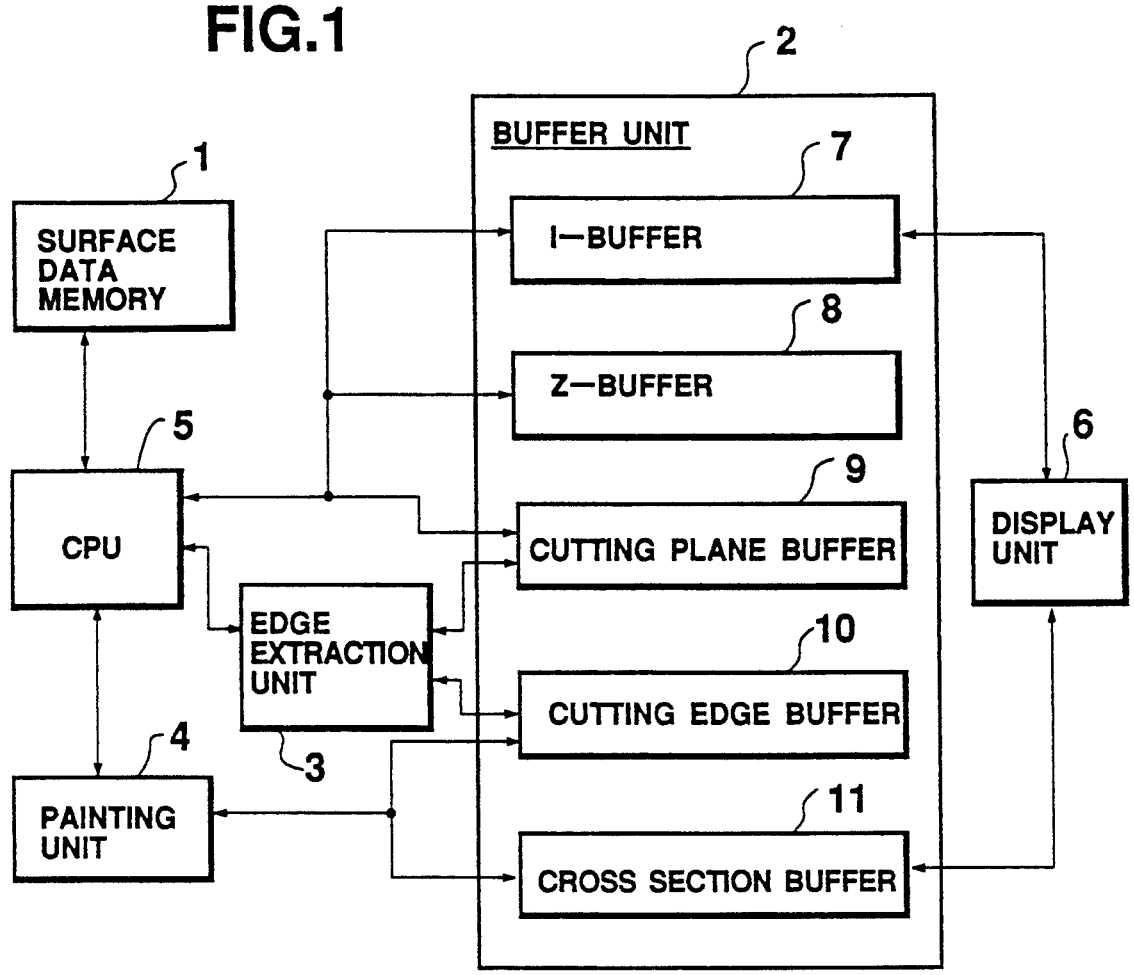

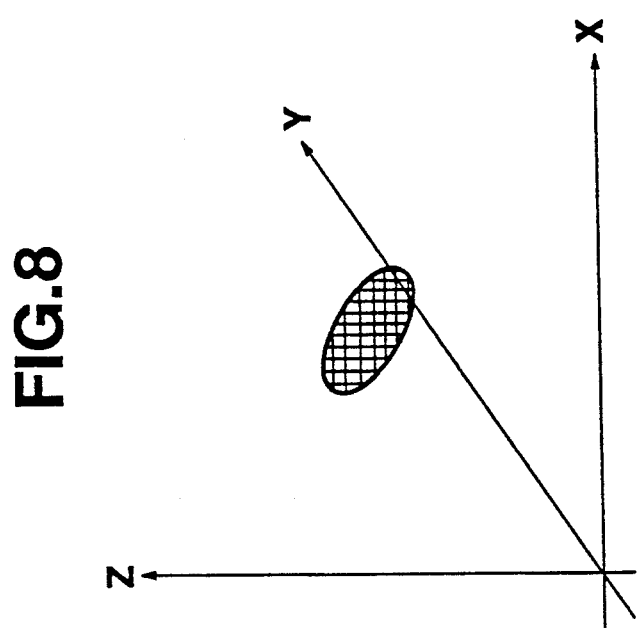
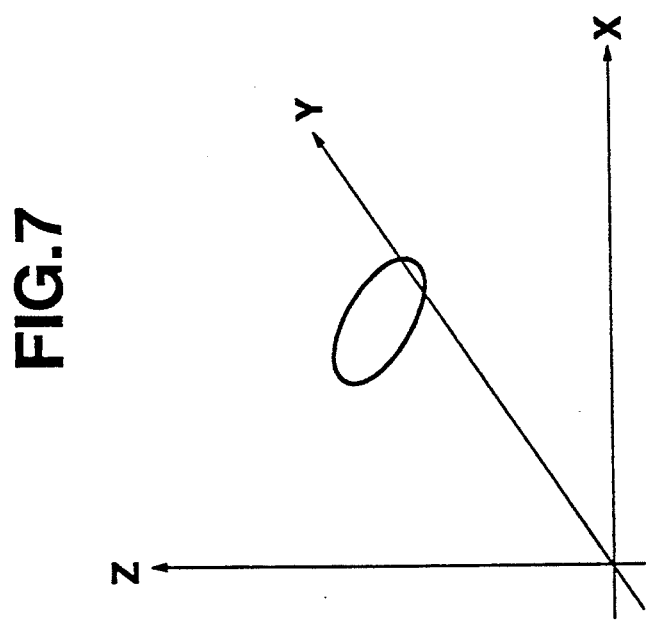
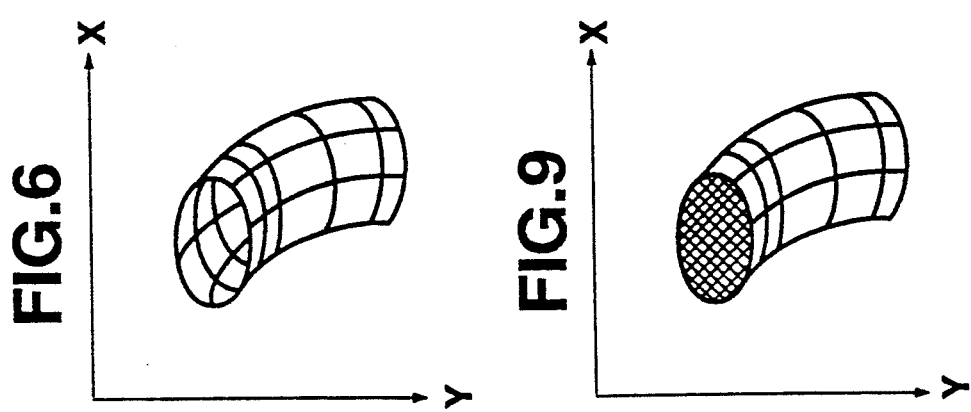

METHOD AND APPARATUS FOR THREE DIMENSIONAL DISPLAY WITH CROSS SECTION

This application is a continuation of application Ser. No. 07/453,507, filed Dec. 20, 1989, now abandoned.

BACKGROUND OF THE INVENTION

1. Field of the Invention

The present invention relates to a method and an apparatus for three dimensional display with cross section used in such apparatuses as medical apparatuses and industrial measurement apparatuses.

2. Description of the Background Art

Recent progress in a field of computer graphics made a real time display possible, and is prompting the increasing usage of three dimensional display which is more realistic than two dimensional display.

In the three dimensional display, it is known to be effective to show a cross section at a specified cutting plane, so that the three dimensional display is often shown with cross section.

In such a three dimensional display with cross section, if a cross section is displayed in such a manner that those portions of an object which are closer to a viewer than a cutting plane are erased so that the cross sectional face is left open, the other portions of the object behind the cutting plane become visible and the cutting edge becomes obscure.

For this reason, in the three dimensional display, the cross sectional face is also treated as a surface and is displayed as being painted out in a prescribed color.

However, in displaying such an object with cross section three dimensionally, it has conventionally been necessary to produce surface data representing the object with the cross sectional face as a part of surface for each cross section, so that when the cutting plane is to be changed, a great amount of time has been required in obtaining the new surface data.

SUMMARY OF THE INVENTION

It is therefore an object of the present invention to provide a method and an apparatus for three dimensional display with cross section capable of producing cross sectional faces easily such that an object with cross section can be displayed three dimensionally in real time.

According to one aspect of the present invention there is provided an apparatus for three dimensionally displaying an object with a cross section, comprising: surface data memory means for storing surface data representing a surface of the object; cutting plane buffer means for storing cutting plane data representing a cutting plane on which the cross section lies; surface image generating means for generating a surface image in which the object is cut at the cutting plane and the cross section is left open from the surface data and the cutting plane data; cross sectional image generating means for generating a cross sectional image in which an interior region of the cross section is painted out in a prescribed color from the surface data and the cutting plane data; and display means for displaying the surface image and the cross sectional image with the cross sectional image superposed on the surface image.

According to another aspect of the present invention there is provided a method of three dimensional display of an object with a cross section, comprising the steps of: storing surface data representing a surface of the object; storing cutting plane data representing a cutting plane on which the cross section lies; generating a surface image in which the object is cut at the cutting plane and the cross section is left open from the surface data and the cutting plane data; generating a cross sectional image in which an interior region of the cross section is painted out in a prescribed color from the surface data and the cutting plane data; and displaying the surface image and the cross sectional image with the cross sectional image superposed on the surface image.

Other features and advantages of the present invention will become apparent from the following description taken in conjunction with the accompanying drawings.

BRIEF DESCRIPTION OF THE DRAWINGS

FIG. 1 is a schematic block diagram of one embodiment of an apparatus for three dimensional display according to the present invention.

FIG. 2 is an illustration of a table of a triangular patch data to be utilized in the apparatus of FIG. 1.

FIG. 6 is a display of the apparatus of FIG. 1 with the cross section left open.

FIG. 7 is a perspective illustration of a cutting edge at the cross section of FIG. 5.

FIG. 8 is a perspective illustration of the cutting edge of FIG. 7 with its interior region painted out.

FIG. 9 is a display of the apparatus of FIG. 1 with the cross section painted out.

DETAILED DESCRIPTION OF THE PREFERRED EMBODIMENTS

Figure 5:
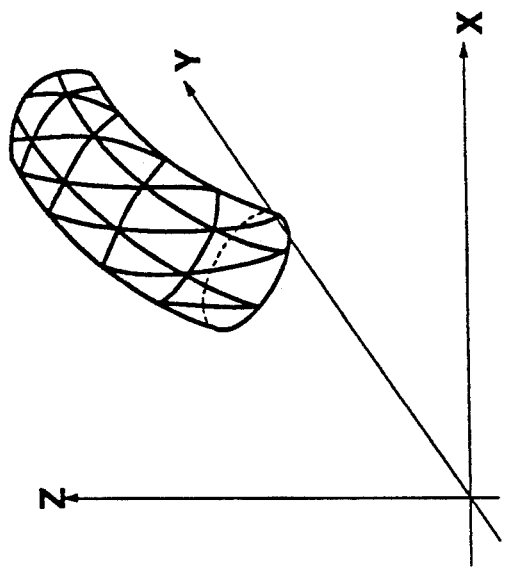
FIG. 5 is a perspective illustration of the object of FIG. 3 with a cross section at the cutting plane of FIG. 4.

Referring now to FIG. 1, there is shown one embodiment of an apparatus for three dimensional display according to the present invention.

In this embodiment, the apparatus comprises a surface data memory 1 for storing surface data representing a surface of a three dimensional object to be displayed, a buffer unit 2 for temporarily storing various data necessary in producing a display image, an edge extraction unit 3 for extracting a cutting edge of a cross section, a painting unit 4 for painting out the extracted cutting edge of the cross section, a CPU 5 for coordinating operations of the apparatus and performing various calculations necessary in the operations, and a display unit 6 for displaying the three dimensional object with the cross section.

In this apparatus, when a cutting plane is specified, an image of the surface cut at the cutting plane are generated from the surface data and data representing the cutting plane by utilizing a so called Z-buffer algorithm, while an image of the cross section is also generated from the surface data and the data representing the cutting plane, which is superposed on the surface image in a final display.

The surface data memory 1 stores the surface data in a form of a collection of triangular patches, each of which is given by X, Y, and Z coordinates of three vertices and a luminance of a triangle specified by the three vertices, as shown in FIG. 2.

The buffer unit 2 includes an I-buffer 7 for storing the luminance of the surface to be displayed at each X and Y coordinates of a display plane, which is taken to be a X-Y plane in this embodiment, a Z-buffer 8 for storing Z coordinates of the surface to be displayed at each X and Y coordinates of the display plane, a cutting plane buffer 9 for storing cutting plane data, a cutting edge buffer 10 for storing the cutting edge of the cross section at the cutting plane, and a cross section buffer 11 for storing data of cross sectional image to be superposed on the surface image. The cutting plane is specified externally by an operator from which the cutting plane data to be entered to the cutting plane buffer 9 are calculated by the CPU 5, whereas data stored in the I-buffer 7, Z-buffer 8, the cutting edge buffer 10, and the cross section buffer 11 are changed in a course of operations to generate display images. In these I-buffer 7, Z-buffer 8, cutting plane buffer 9, cutting edge buffer 10, and cross section buffer 11, two dimensional memory addresses represents X and Y coordinates, and memorized quantity at each address represents the luminance in a case of the I-buffer 7 and the Z coordinate in cases of the other buffers. It is to be noted that contents of the I-buffer 7 effectively represents the surface to be displayed with the cross section excluded.

The edge extraction unit 3 extracts the cutting edge of the cross section at the cutting plane from the cutting plane data in the cutting plane buffer 9 and the surface data in the surface data memory 1 obtained through the CPU 5, and stores the extracted cutting edge in the cutting edge buffer 10. This edge extraction unit 3 will be described in further detail below.

The painting unit 4 takes the cutting edge stored in the cutting edge buffer 10 and paints out its interior region with a prescribed color different from that of the surface in order to obtain the cross sectional image, and stores the obtained cross sectional image in the cross section buffer 11.

The CPU 5 reads out the surface data from the surface data memory 1, calculates the luminance and the Z coordinate at each X and Y coordinates of the display plane from the surface data, and enters the appropriate luminance and Z coordinates into the I-buffer 7 and the Z-buffer 8, respectively, in order to obtain the surface image, as will be described in detail below. Meanwhile, the CPU 5 also controls the operations of the edge extraction unit 3 and the painting unit 4 in order to obtain the cross sectional image.

The display unit 6 superposes the cross sectional image on the surface image, and displays the three dimensional object with the cross section looked from a X-Y plane.

With references to FIGS. 3–9, the operation of the apparatus of FIG. 1 will now be described.

First, a case in which the cutting plane is not specified will be described. In this case, CPU 5 reads out the surface data from the surface data memory 1, and calculates the luminance and the Z coordinate at each X and Y coordinates of the display plane from the surface data.

Then the CPU 5 reads out the Z coordinate stored in the Z-buffer 8 for each X and Y coordinates, and compares the Z coordinate calculated from the surface data and the Z coordinate read from the Z-buffer 8. If the calculated Z coordinate is closer to a X-Y plane, this calculated Z coordinate is entered into the Z-buffer 8 and the corresponding luminance is entered into the corresponding address of the I-buffer 7, whereas otherwise the Z-buffer 8 and the I-buffer 7 are left unchanged.

By going through this operation for all the X and Y coordinates, the luminances and Z coordinates of each portion of the surface which are visible from X-Y plane and are therefore to be displayed can be obtained in the I-buffer 7 and Z-buffer 8.

Now, when the cutting plane is externally specified in the cutting plane buffer 9, the following operations are performed.

Figure 4:
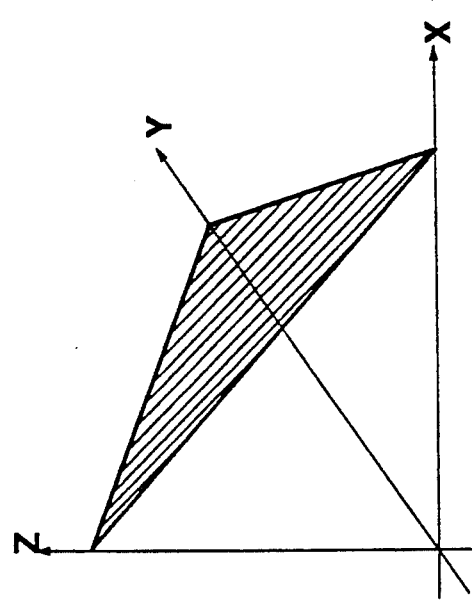
FIG. 4 is a perspective illustration of an example of a cutting plane to be specified in the apparatus of FIG. 1.
Figure 3:
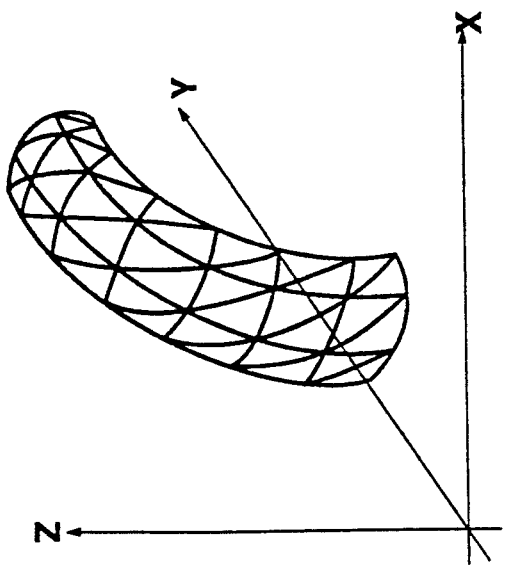
FIG. 3 is a perspective illustration of an example of an object to be displayed by the apparatus of FIG. 1.
Figure 10:
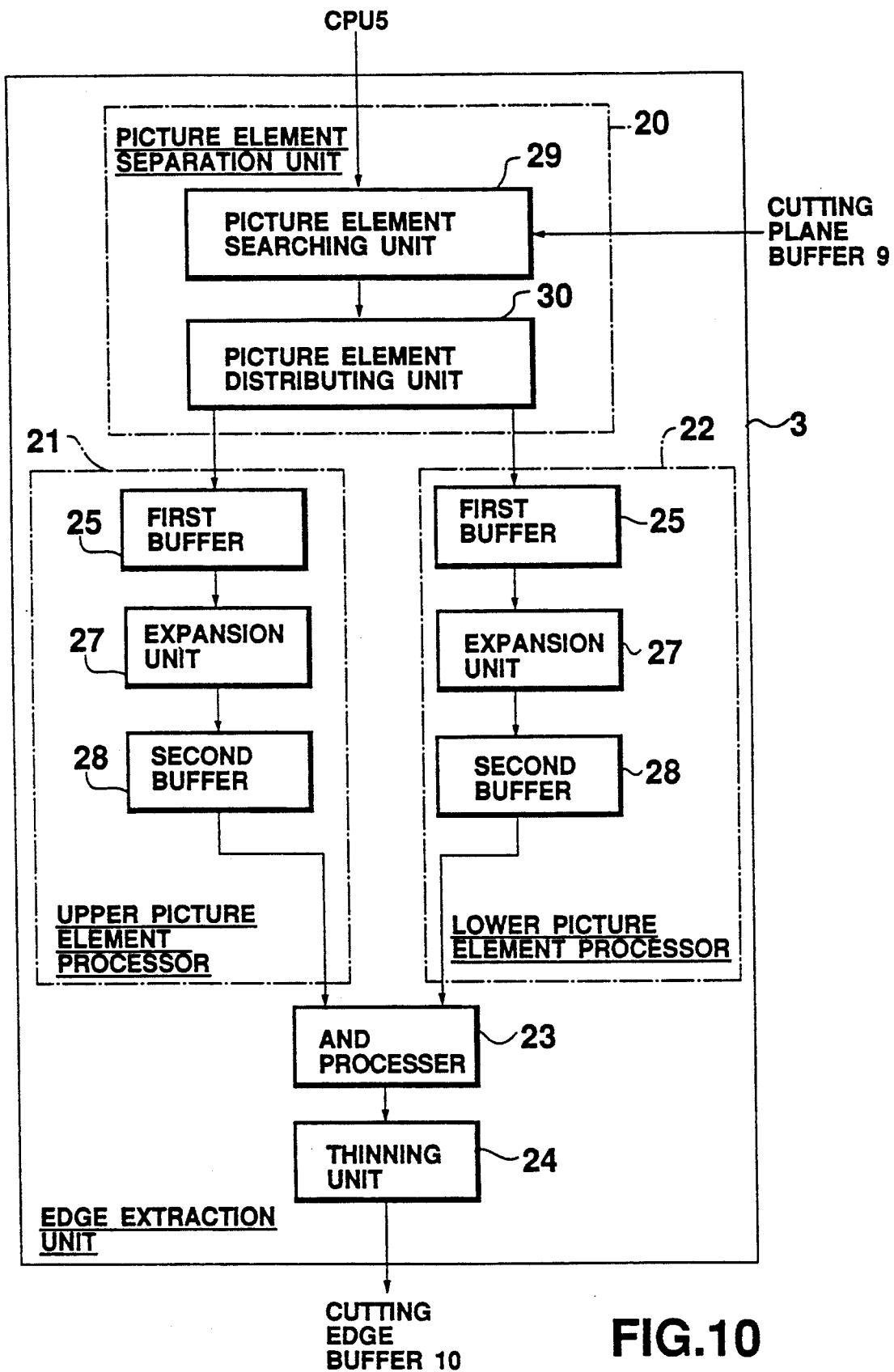
FIG. 10 is a block diagram of an edge extraction unit of the apparatus of FIG. 1.

For an object shown in FIG. 3, when the cutting plane shown in FIG. 4 is specified such that a display for a state of the object shown in FIG. 5 can be obtained, the CPU 5 calculates Z coordinates of the cutting plane at each X and Y coordinates and stores them as the cutting plane data in the cutting plane buffer 9.

Then, the CPU 5 reads out the surface data from the surface data memory 1, and calculates the luminance and the Z coordinate at each X and Y coordinates of the display plane from the surface data, as in the previous case.

Next, the CPU 5 reads out the Z coordinate stored in the cutting plane buffer 9 for each X and Y coordinates, and compares the Z coordinate calculated from the surface data and the Z coordinate read from the cutting plane buffer 9. If the calculated Z coordinate is closer to a X-Y plane, a picture element corresponding to these X, Y, and Z coordinates is labeled invalid so as not to be displayed, whereas otherwise the picture element is labeled valid.

Next, for those picture elements which are labeled valid, the operation similar to that in the previous case is performed by the CPU 5. Namely, for such picture elements, the CPU 5 reads out the Z coordinate stored in the Z-buffer 8 for each X and Y coordinates, and compares the Z coordinate calculated from the surface data and the Z coordinate read from the Z-buffer 8. If the calculated Z coordinate is closer to a X-Y plane, this calculated Z coordinate is entered into the Z-buffer 8 and the corresponding luminance is entered into the corresponding address of the I-buffer 7, whereas otherwise the Z-buffer 8 and the I-buffer 7 are left unchanged.

By going through these operations for all the X and Y coordinates, the luminances and Z coordinates of each portion of the surface which are visible from X-Y plane and are therefore to be displayed can be obtained in the I-buffer 7 and Z-buffer 8, such that a display in which the cross section is left open as shown in FIG. 6 is displayed at the display unit 6.

Meanwhile, at the same time the display of FIG. 6 is being obtained, the following operations are carried out by the edge extraction unit 3 and the painting unit 4.

Namely, the edge extraction unit 3 extracts the cutting edge shown in FIG. 7 from the cutting plane data in the cutting plane buffer 9 and the Z coordinate at each X and Y coordinates of the display plane obtained from the surface data by the CPU 5, and stores the Z coordinates of the cutting edge in the cutting edge buffer 10. Then, the painting unit 4 paints out the interior region enclosed by the cutting edge by the prescribed color different from that of the surface as shown in FIG. 8 in order to obtain the cross sectional image, and stores the obtained cross sectional image in the cross section buffer 11. Finally, the display unit 6 superposes the cross sectional image in the cross section buffer 11 on the surface image in the I-buffer 7, and displays the three dimensional object with the cross section distinctively painted out as shown in FIG. 9.

In further detail, these operations by the edge extraction unit 3 and the painting unit 4 are carried out as follows.

The edge extraction unit 3 in further detail comprises a picture element separation unit 20 for separating out picture elements of the display unit 6 in a vicinity of the cutting plane, an upper picture element processor 21 for image processing those picture elements among the separated picture elements which are located immediately above the cutting plane, a lower picture element processor 22 for image processing those picture elements among the separated picture elements which are located immediately below the cutting plane, an AND processor 23 for taking AND (or intersection) of the outputs of the upper and lower picture element processors 21 and 22, and a thinning unit 24 for thinning the output of the AND processor 23.

The picture element separation unit 20 further comprises a picture element searching unit 29, in which whether each of the Z coordinates calculated from the surface data by the CPU 5 is within a prescribed range around the Z coordinates of the cutting plane in the cutting plane buffer 9 is checked by subtracting the Z coordinate of the cutting plane from the Z coordinate calculated from the surface data and comparing the difference with a magnitude of the prescribed range in order to search out the picture elements in the vicinity of the cutting plane, and a picture element distributing unit 30, in which the searched out picture elements are distributed to the upper and lower picture element processors 21 and 22 in accordance with the sign of the difference between the Z coordinate of the cutting plane and the Z coordinate calculated from the surface data, i.e., when the difference is positive the picture element is given to the upper picture element processor 21, whereas otherwise the picture element is given to the lower picture element processor 22.

Figure 11:
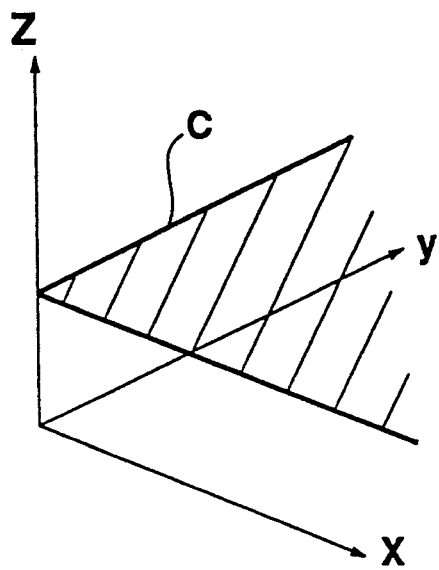
FIG. 11 is a perspective illustration of another example of a cutting plane to be specified in the apparatus of FIG. 1 for explaining the operation of the edge extraction unit of FIG. 10.
Figure 12:
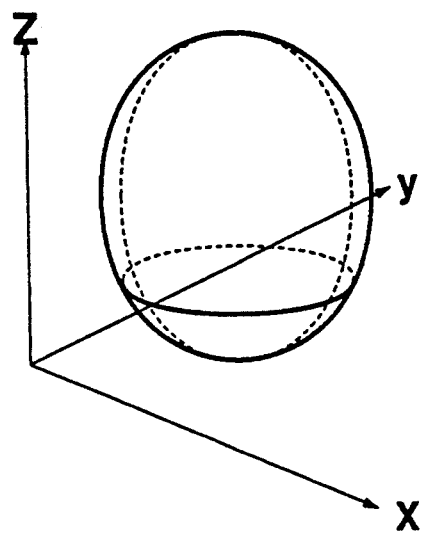
FIG. 12 is a perspective illustration of another example of an object to be displayed by the apparatus of FIG. 1 for explaining the operation of the edge extraction unit of FIG. 10.
Figure 13:
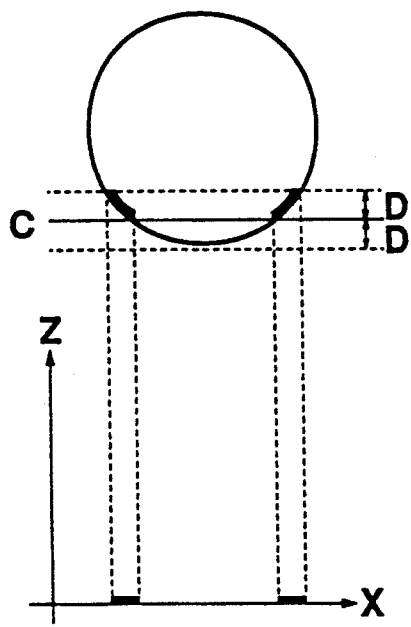
FIG. 13 is a cross sectional view of the cutting edge of FIG. 11 and the object of FIG. 12 for explaining the operation of the edge extraction unit of FIG. 10.
Figure 14:
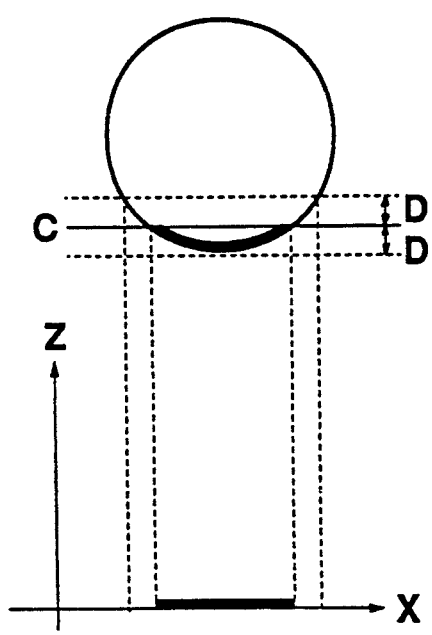
FIG. 14 is another cross sectional view of the cutting edge of FIG. 11 and the object of FIG. 12 for explaining the operation of the edge extraction unit of FIG. 10.

For example, for a cutting plane C shown in FIG. 11 which is parallel to the X-Y plane, and for a spherical object shown in FIG. 12, those picture elements above the cutting plane C by not more than a prescribed range D as shown in FIG. 13 are separated by the picture element separation unit 20 and are given to the upper picture element processor 21 in binary data, whereas those picture elements below the cutting plane C by not more than a prescribed range D as shown in FIG. 14 are separated by the picture element separation unit 20 and are given to the lower picture element processor 22 in binary data.

Figure 16:
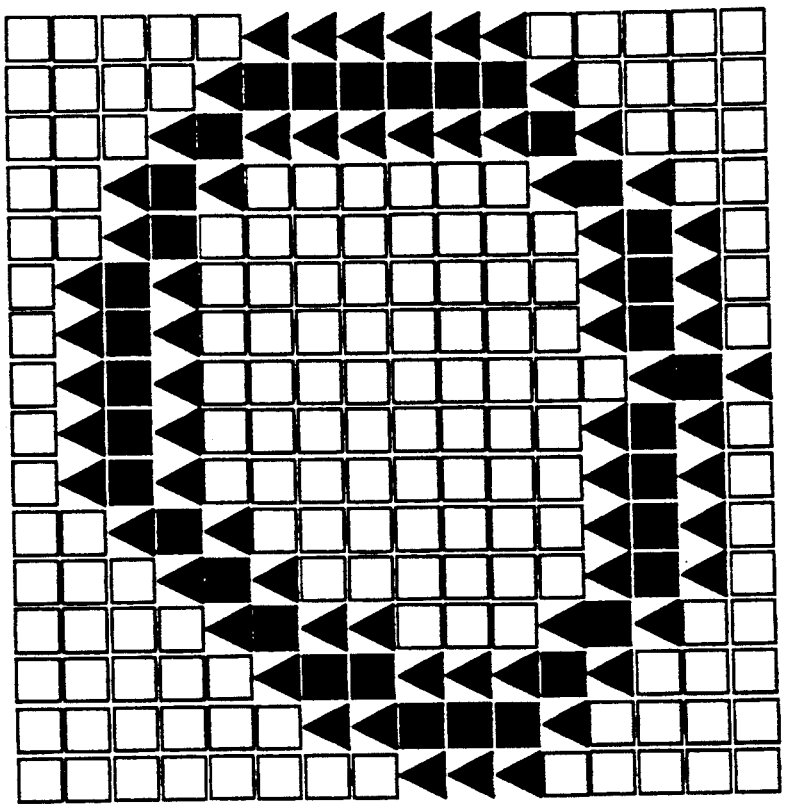
FIG. 16 is another illustration of the picture elements to be processed in the edge extraction unit of FIG. 10 at another stage of its operation.
Figure 15:
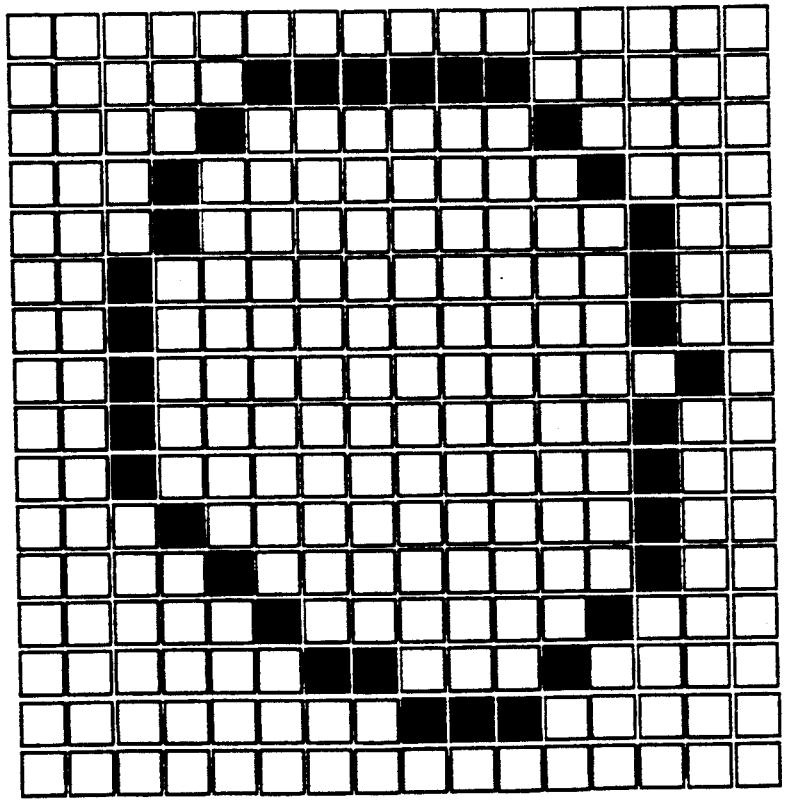
FIG. 15 is an illustration of the picture elements to be processed in the edge extraction unit of FIG. 10 at one stage of its operation.

The upper picture element processors 21 includes a first buffer 25 for temporarily storing the picture elements given from the picture element separation unit 20 in binary data, an expansion unit 27 for expanding the binarized picture elements into four nearest neighbors, and a second buffer 28 for temporarily storing the expanded picture elements. For the above example of FIG. 13, the binarized picture elements at the first buffer 25 is as shown in FIG. 15, and the expanded picture elements at the expansion unit 27 is as shown in FIG. 16 in which triangles represents those picture elements expanded.

Figure 18:
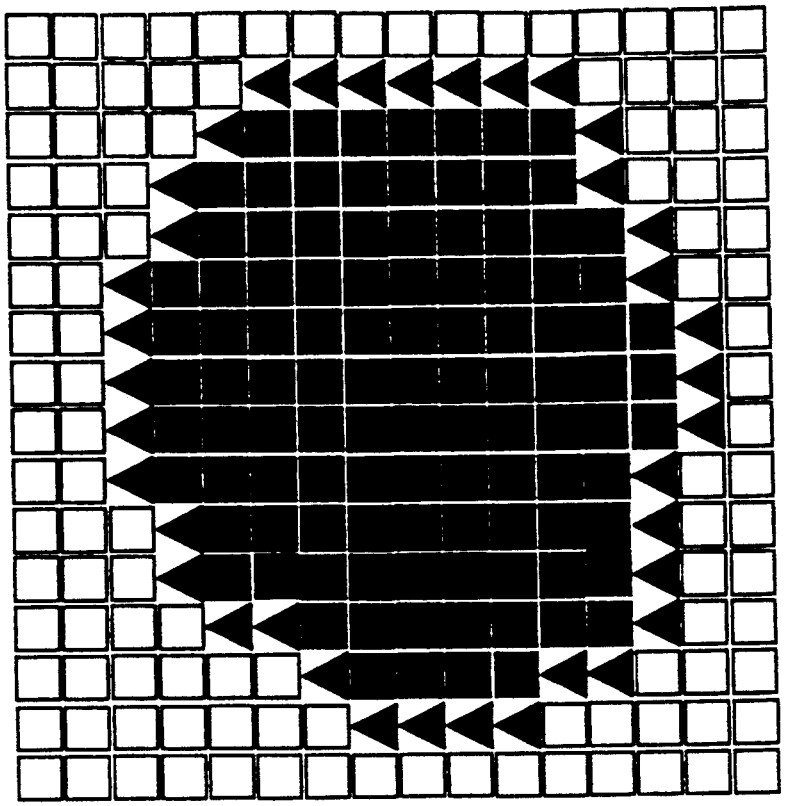
FIG. 18 is another illustration of the picture elements to be processed in the edge extraction unit of FIG. 10 at another stage of its operation.
Figure 17:
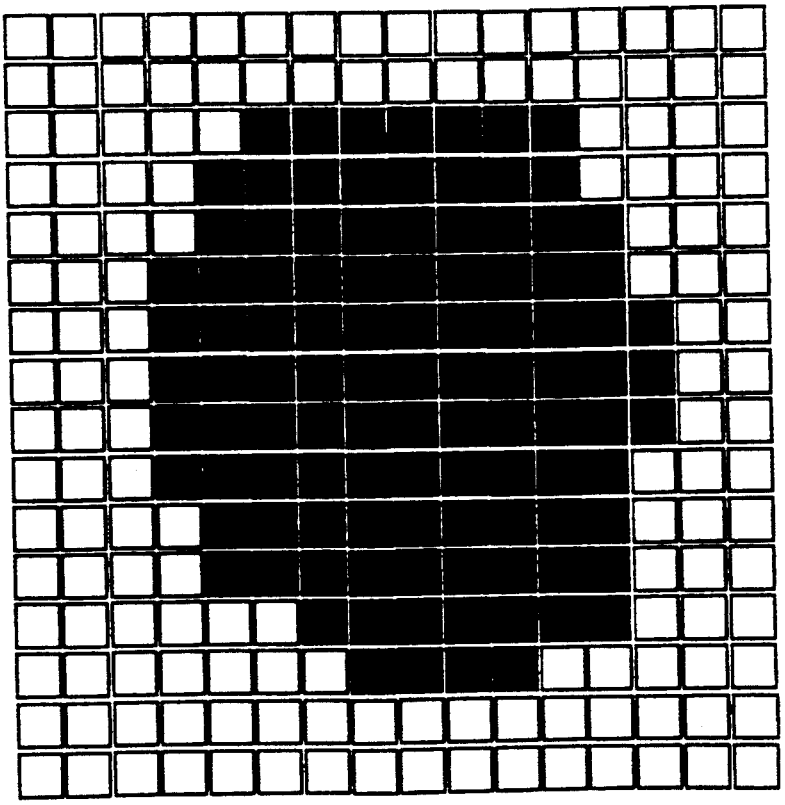
FIG. 17 is another illustration of the picture elements to be processed in the edge extraction unit of FIG. 10 at another stage of its operation.

Similarly, the lower picture element processors 22 includes a first buffer 25 for temporarily storing the picture elements given from the picture element separation unit 20 in binary data, an expansion unit 27 for expanding the binarized picture elements into four nearest neighbors, and a second buffer 28 for temporarily storing the expanded picture elements. For the above example of FIG. 14, the binarized picture elements at the first buffer 25 is as shown in FIG. 17, and the expanded picture elements at the expansion unit 27 is as shown in FIG. 18 in which triangles represents those picture elements expanded.

Figure 20:
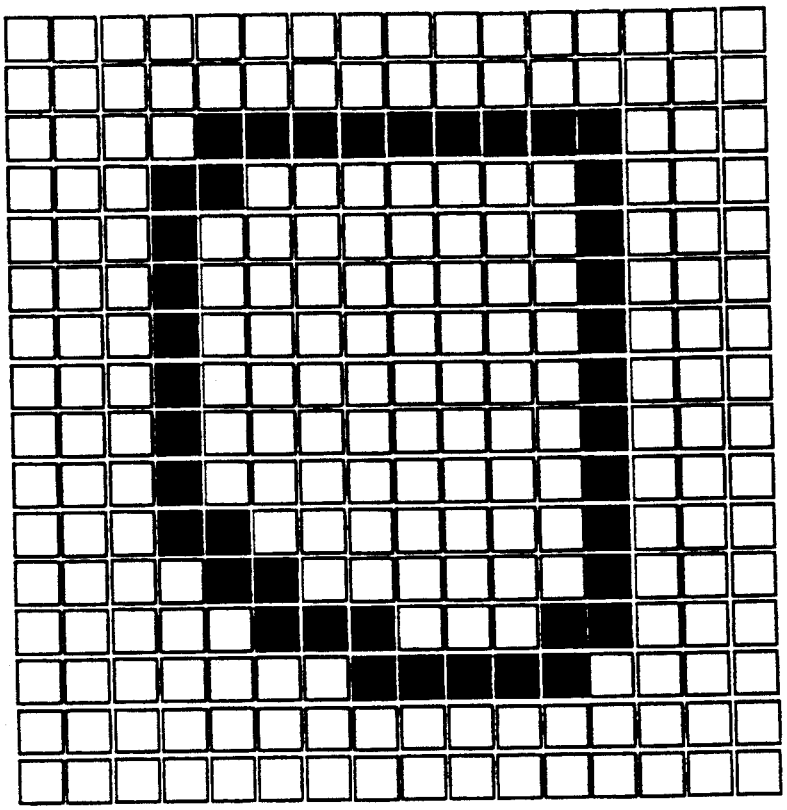
FIG. 20 is another illustration of the picture elements to be processed in the edge extraction unit of FIG. 10 at another stage of its operation.
Figure 19:
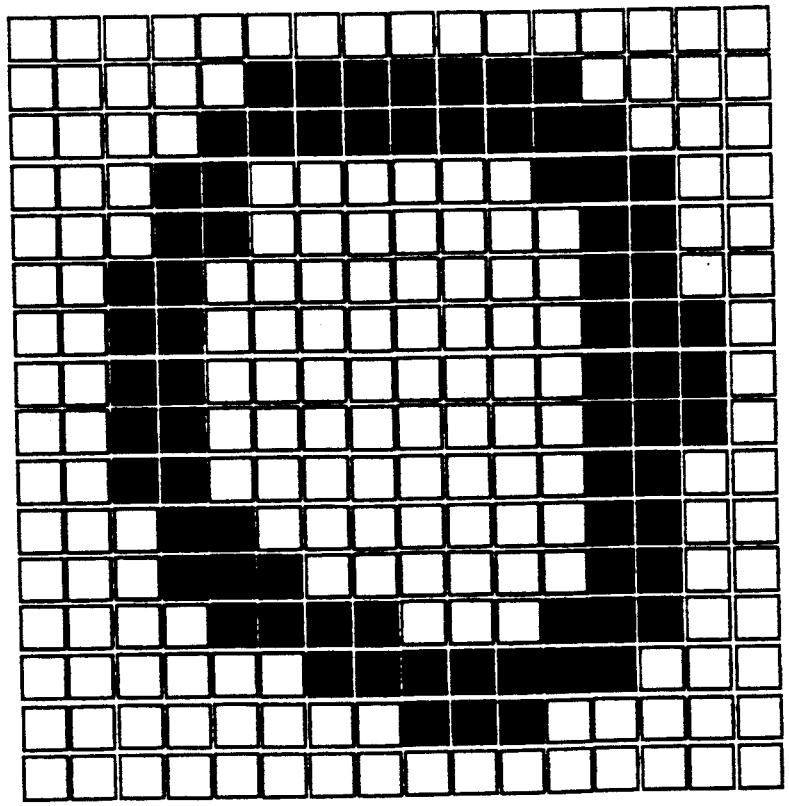
FIG. 19 is another illustration of the picture elements to be processed in the edge extraction unit of FIG. 10 at another stage of its operation.

The AND of the expanded picture elements in the buffers 28 of the upper and lower picture element processors 21 and 22 are then taken at the AND processor 23, as shown in FIG. 19, and are then thinned at the thinning unit 24, as shown in FIG. 20 to obtain the cutting edge data to be stored in the cutting edge buffer 10.

Figure 21:
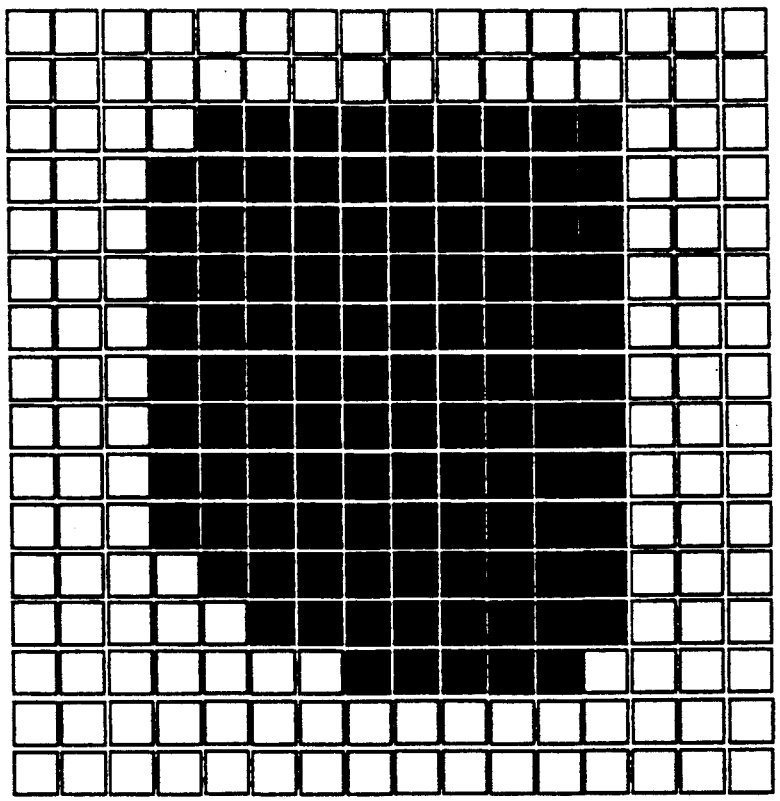
FIG. 21 is an illustration of the picture elements to be displayed by the apparatus of FIG. 1 as a cross sectional image.

The cutting edge data thus obtained are then taken by the painting unit 4 which paints out the interior region enclosed by the cutting edge by the prescribed color as shown in FIG. 21. This can be achieved in any known method such as that utilizing the decomposition of the cutting edge into 4- or 8-connected closed loops, and the calculation of vector data for chain chords of each closed loop.

As described, according to this embodiment, the surface image with the cross section left open and the cross sectional image painted out in different color from the surface image are generated simultaneously and are displayed as the cross sectional image superposed on the surface image, so that an object with cross section can be displayed three dimensionally in real time.

It is to be noted that many modifications and variations of the above embodiments may be made without departing from the novel and advantageous features of the present invention. Accordingly, all such modifications and variations are intended to be included within the scope of the appended claims.

What is claimed is:

1. An apparatus for three dimensionally displaying an object with a cross section, comprising:
    two dimensional surface data memory means for storing surface data representing a surface of said object in a form of a collection of two dimensional figures;
    two dimensional cutting plane buffer means for storing cutting plane data representing a cutting plane on which said cross section lies;
    surface image generating means for generating a surface image, in which said object is cut at said cutting plane and said cross section is left open, from said surface data and said cutting plane data;
    cross sectional image generating means for generating a cross sectional image, in which an interior region of said cross section is painted in a prescribed color, from said surface data and said cutting plane data, and where said cross sectional image generating means generates said cross sectional image during a generation of said surface image by said surface image generating means, in parallel to generation of said surface image by said surface image generating means; and
    display means for displaying said surface image and said cross sectional image by superposing said cross sectional image as generated by said cross sectional image generating means on said surface image as generated by said surface image generating means.

2. The apparatus of claim 1, wherein the cross sectional image generating means includes:
    edge extracting means for extracting a cutting edge of the object at the cutting plane from the surface data and the cutting plane data; and
    painting means for painting an interior region enclosed by the extracted cutting edge in the prescribed color.

3. The apparatus of claim 2, wherein the edge extracting means includes means for searching picture elements located in a vicinity of the cutting plane by comparing the surface data and the cutting plane data to determine picture elements in the surface data located within a prescribed range of the cutting plane.

4. The apparatus of claim 3, wherein the edge extracting means further includes:
    means for classifying said picture elements located in a vicinity of the cutting plane into first picture elements located immediately above the cutting plane and second picture elements located immediately below the cutting plane;
    means for expanding the first picture elements located immediately above the cutting plane and the second picture elements located immediately below the cutting plane;
    means for taking an intersection of a first projection of the expanded first picture elements located immediately above the cutting plane and a second projection of the expanded second picture elements located immediately below the cutting plane; and
    means for thinning the intersection to obtain the cutting edge.

5. A method of three dimensional display of an object with a cross section, comprising the steps of:
    storing surface data representing a surface of said object in a form of a collection of two dimensional figures;
    storing two dimensional cutting plane data representing a cutting plane on which said cross section lies;
    generating a surface image, in which said object is cut at said cutting plane and said cross section is left open, from said surface data and said cutting plane data;
    generating a cross sectional image, in which an interior region of said cross section is painted in a prescribed color, from said surface data and said cutting plane data, wherein said cross sectional image is generated during a generation of said surface image at said surface image generating step, in parallel to generation of said surface image at said surface image generating step; and
    displaying said surface image and said cross sectional image by superposing said cross sectional image as generated at said cross sectional image generating step on said surface image as generated at said surface image generating step.

6. The method of claim 5, wherein the generation of the cross sectional image includes the steps of:
    extracting a cutting edge of the object at the cutting plane from the surface data and the cutting plane data; and
    painting an interior region enclosed by the extracted cutting edge the prescribed color.

7. The method of claim 6, further comprising the step of: searching picture elements located in a vicinity of the cutting plane by comparing the surface data and the cutting plane data to determine picture elements in the surface data located within a prescribed range of the cutting plane.

8. The method of claim 7, further comprising the steps of:
    classifying said picture elements located in the vicinity of the cutting plane into first picture elements located immediately above the cutting plane and second picture elements located immediately below the cutting plane;
    expanding the first picture elements located immediately above the cutting plane and the second picture elements located immediately below the cutting plane;
    taking an intersection of a first projection of the expanded first picture elements located immediately above the cutting plane and a second projection of the expanded second picture elements located immediately below the cutting plane; and
    thinning the intersection to obtain the cutting edge.

* * * * *